United States Patent
Lanman et al.

(10) Patent No.: US 9,335,553 B2
(45) Date of Patent: May 10, 2016

(54) CONTENT-ADAPTIVE PARALLAX BARRIERS FOR AUTOMULTISCOPIC DISPLAY

(71) Applicants: Douglas Lanman, Bellevue, WA (US); Matthew Hirsch, Somerville, MA (US); Yun Hee Kim, Seoul (KR); Szymon Jakubczak, San Francisco, CA (US); Ramesh Raskar, Cambridge, MA (US)

(72) Inventors: Douglas Lanman, Bellevue, WA (US); Matthew Hirsch, Somerville, MA (US); Yun Hee Kim, Seoul (KR); Szymon Jakubczak, San Francisco, CA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/836,212

(22) Filed: Aug. 26, 2015

(65) Prior Publication Data
US 2015/0362743 A1   Dec. 17, 2015

Related U.S. Application Data

(63) Continuation of application No. 13/309,535, filed on Dec. 1, 2011, now Pat. No. 9,146,403.

(60) Provisional application No. 61/418,650, filed on Dec. 1, 2010.

(51) Int. Cl.
| | |
|---|---|
| G02B 26/00 | (2006.01) |
| G02F 1/1335 | (2006.01) |
| H04N 13/04 | (2006.01) |
| H04N 15/00 | (2006.01) |
| G02B 27/22 | (2006.01) |

(52) U.S. Cl.
CPC .......... *G02B 27/2214* (2013.01); *G02B 27/225* (2013.01); *G02B 27/2264* (2013.01); *H04N 13/0406* (2013.01); *H04N 13/0413* (2013.01); *H04N 13/0418* (2013.01)

(58) Field of Classification Search
USPC .................... 348/52, 58, 59; 359/238; 349/15
See application file for complete search history.

(56) References Cited

U.S. PATENT DOCUMENTS

| | | | | |
|---|---|---|---|---|
| 5,745,197 A | * | 4/1998 | Leung | G02B 27/2278 348/E13.02 |
| 6,806,849 B2 | | 10/2004 | Sullivan | |

(Continued)

OTHER PUBLICATIONS

Lee et al. "Learning the parts of objects by non-negative matrix factorization". Nature 401,788-791 (Oct. 21, 1999) I doi: 10.1038/44565; Received May 24, 1999; Accepted Aug. 6, 1999.*

(Continued)

*Primary Examiner* — Christopher S Kelley
*Assistant Examiner* — Ana Picon-Feliciano
(74) *Attorney, Agent, or Firm* — Stephen R. Otis

(57) ABSTRACT

In exemplary implementations of this invention, two LCD screens display a multi-view 3D image that has both horizontal and vertical parallax, and that does not require a viewer to wear any special glasses. Each pixel in the LCDs can take on any value: the pixel can be opaque, transparent, or any shade between. For regions of the image that are adjacent to a step function (e.g., a depth discontinuity) and not adjacent to a sharp corner, the screens display local parallax barriers comprising many small slits. The barriers and the slits tend to be oriented perpendicular to the local angular gradient of the target light field. In some implementations, the display is optimized to seek to minimize the Euclidian distance between the desired light field and the actual light field that is produced. Weighted, non-negative matrix factorization (NMF) is used for this optimization.

20 Claims, 11 Drawing Sheets

(56) References Cited

U.S. PATENT DOCUMENTS

| | | | |
|---|---|---|---|
| 6,985,290 B2 | 1/2006 | Putilin et al. | |
| 7,342,721 B2* | 3/2008 | Lukyanitsa | G02B 27/2214 345/6 |
| 7,580,085 B2* | 8/2009 | Jacobs | G02B 5/3083 349/117 |
| 7,609,906 B2* | 10/2009 | Matusik | H04N 13/0018 348/59 |
| 8,749,620 B1* | 6/2014 | Knight | H04N 13/0011 348/49 |
| 2003/0038922 A1 | 2/2003 | Ferrell | |
| 2008/0143895 A1* | 6/2008 | Peterka | G02B 27/0093 349/15 |
| 2008/0170293 A1* | 7/2008 | Lucente | H04N 13/0406 359/463 |
| 2008/0187305 A1* | 8/2008 | Raskar | G02B 27/0075 396/268 |
| 2008/0316201 A1* | 12/2008 | Nayar | H04N 13/0242 345/419 |
| 2011/0174998 A1* | 7/2011 | Molnar | G01S 3/782 250/550 |
| 2011/0211256 A1* | 9/2011 | Connor | G02B 27/2285 359/463 |

OTHER PUBLICATIONS

Levoy, Marc, and Pat Hanrahan. "Light field rendering." Proceedings of the 23rd annual conference on Computer graphics and interactive techniques. ACM, 1996.*

Lukianitsa, A., et al., Stereodisplay with neural network image processing, 2002, SPIE—IT&T Stereoscopic Displays and Virtual Reality Systems IX, vol. 4660, 207-211.

Lee, D., et al., Learning the parts of objects by non-negative matrix factorization, Nature, vol. 401, pp. 788-791, Oct. 1999, Macmillan Magazines Ltd.

* cited by examiner

CONTENT-ADAPTIVE PARALLAX BARRIERS FOR AUTOMULTISCOPIC DISPLAY

RELATED APPLICATIONS

This application is a continuation of U.S. application Ser. No. 13/309,535 filed on Dec. 1, 2011 (the "Parent application"), which claims the benefit of U.S. Provisional No. 61/418,650, filed Dec. 1, 2010 (the "Provisional Application"). The entire disclosures of the Parent Application and the Provisional Application are herein incorporated by reference.

FIELD OF THE TECHNOLOGY

The present invention relates generally to automultiscopic displays.

SUMMARY

In exemplary implementations of this invention, two LCD screens produces a 3D image that has vertical and horizontal motion parallax, and that does not require a viewer to wear any special glasses (or other optical equipment).

The 3D image includes multiple views; the view that is seen depends on the angle of viewing. For example, the viewer's left and right eyes each see a different view. The resulting binocular parallax creates an appearance of depth. Also, for example, as the viewer moves his or her head, the view changes. The resulting motion parallax helps create an illusion of depth.

The dual-stacked LCDs are backlit by an incoherent light source behind the rear LCD screen. The two LCD screens act as spatial light modulators.

In these exemplary implementations, each pixel in the LCDs can take on any value: the pixel can be opaque, transparent, or any shade (any degree of translucency) between. Thus, each of the two LCD screens can display any arbitrary image.

This is quite different than a conventional automultiscopic display with dual-stacked LCDs. In the conventional approach: (1) the front screen displays a mask, (2) the mask comprises evenly spaced slits or a regular grid of pinholes, (3) the pixels in the front screen are limited to binary values (opaque, transparent), and (4) the mask severely attenuates the light intensity of the 3D image. The light attenuation is more severe for pinholes (that create 2D parallax) than for regularly spaced slits (that create 1D parallax).

In contrast, in exemplary implementations, this invention produces brighter images. For example, a prototype of this invention can create an image with 2D parallax (i.e., both horizontal and vertical parallax). So can a conventional pinhole parallax barrier display. However, the image produced by the prototype is about three times brighter than the image produced by the conventional display (holding the power consumption, angular resolution and spatial resolution of the displays constant).

In exemplary implementations of this invention, the parallax barriers displayed by the dual-stacked LCDs are content adaptive. That is, these parallax barriers adapt to the content of the light field that is sought to be projected.

In exemplary implementations of this invention, in certain areas of each of the two masks, a rotation of slits occurs, as follows: in these areas, (1) local parallax barriers are displayed; (2) these local parallax barriers are ribbon-like in appearance, (3) each such barrier comprises many small slits, and (4) these small slits tend to be rotated perpendicular to the local angular gradient of the target light field.

This rotation occurs in areas of a mask that correspond to areas of the 3D image that are adjacent to a depth discontinuity (step function) and are not adjacent to a sharp corner. The angular gradient in such an area is strong and single-valued. (In contrast, (a) if a depth discontinuity is not present, the angular gradient of the light field tends not to be strong, and (b) adjacent to a sharp corner, the angular gradient is not single-valued.)

In illustrative implementations of this invention, numerical methods are used to compute the images that are displayed by each of the two LCD screens.

Here is an example of such a numerical method:

The images displayed by the two LCD screens for any frame are jointly optimized, in order to seek to minimize the Euclidian distance between (a) the desired (target) light field and (b) the actual light field produced by the two LCD screens. The actual light field for any frame is the outer product of the 2D images shown on the two screens for that frame. The optimization process is done independently, for each frame.

Weighted, non-negative matrix factorization (NMF) is used for this optimization. A weight matrix is applied, in order to spend the degrees of freedom in the two screen images on the central views. Thus, in exemplary implementations, the LCD screens produce correct results when viewed from within a central cone extending straight out from the screens, and produce unconstrained views outside this central cone. (In a prototype, the cone's apex touches a point on the front screen, its axis is normal to the front screen, and its shape is a square pyramid. Alternately, the cone may have other shapes or axis orientations.) In some implementations, weights are selected to support multiple viewers or a wider field of view.

The pixels in the screens are initialized with random values uniformly distributed on [0,1] (0 being opaque and 1 being transparent) A multiplicative update is applied iteratively. At each iteration, the weight matrix is applied to the intermediate result. This prevents values with low weights from influencing the results, and leaves the light rays outside the central cone unconstrained.

An important insight in this invention is that a fixed pair of 2D masks always produces a rank-1 approximation of a set of light rays ("rank" being used here in the linear algebra sense). If two attenuating layers are used to represent a set of light rays, the resulting set of rays have very few degrees of freedom. Thus, an arbitrary set of light rays cannot be accurately represented with just two masks (LCD screens).

The dual-stacked LCDs display a set of rank-1 approximations which have been optimized using NMF. These optimal rank-1 approximations are shown to the viewer very quickly (e.g., up to 120 Hz in a prototype). As the viewer's eye integrates these frames together, a high-rank approximation to the desired set of light rays is perceived by the viewer. This time-multiplexing (showing different images at a high frame rate) also improves the spatial resolution of the 3D display.

In exemplary implementations, the dual-stacked LCDs act as a compressive display. Imagery sent to the display is compressed. But it is compressed in a way that allows the viewer to at least partially decompress it. Any light field sent to the display is reduced to two images—one for the front LCD and one for the rear LCD screen. As these images are presented at a high frame rate, the viewer's eyes integrates the images into a high-rank approximation of the desired light field, thereby at least partially decompressing the imagery The higher the rank approximation that is achieved, the less lossy the compression.

In exemplary implementations of this invention, a tradeoff may be made among display brightness, frame rate (refresh rate) and reconstruction error. For example, when a prototype of this invention runs with a frame rate of 120 Hz, no flicker fusion is perceptible, but the image quality is poor. When the prototype runs with a frame rate of 13 Hz, it accurately reproduces a full rank 3×3 light field, but this speed is below the flicker fusion threshold of the human eye. Running the prototype at a rate between these two extremes achieves an image with no perceptible flicker and good image quality. (The flicker fusion threshold for human vision varies depending on lighting conditions. This means that the display can be run at lower rates/higher quality in low lighting conditions).

In exemplary implementations, the front screen display may be easily switched from a high resolution 2D image to a 3D image, or vice versa. This is an advantage compared to integral imaging with lenticular lenses. A lenticular display can produce an image with both horizontal and vertical parallax, but once the lens are affixed to the screen, they cannot be easily removed, making it impractical to switch a lenticular display between a 2D and 3D mode.

The above description of the present invention is just a summary. It is intended only to give a general introduction to some illustrative implementations of this invention. It does not describe all of the details of this invention. This invention may be implemented in many other ways.

The above Figures illustrate some illustrative implementations of this invention, or provide information that relates to those implementations. The above Figures do not show all of the details of this invention.

DETAILED DESCRIPTION

In conventional prior art, two modified LCD panels are stacked to produce a 3D image. These conventional dual-stacked LCDs use heuristic parallax barriers for view-dependent imagery: the front LCD shows a fixed array of slits or pinholes, independent of the multi-view content. This prior art adapts the spacing between slits or pinholes, depending on viewer position. Also, this prior art permits only binary opacities for pixels in the front screen.

In contrast, in exemplary implementations of this invention, both LCD layers are adapted to the multi-view content, increasing brightness and refresh rate. Unlike conventional barriers, both masks are allowed to exhibit non-binary opacities.

Figure 1:
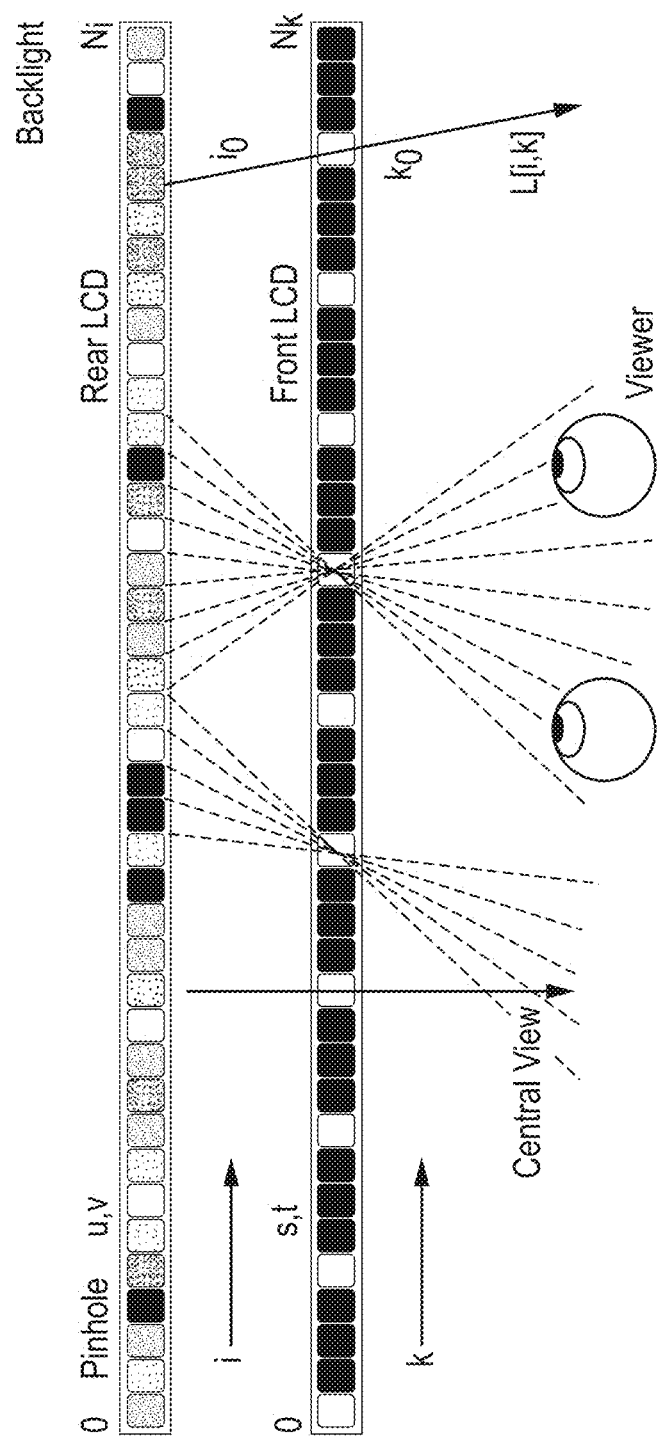
FIG. 1 shows a prior art example of dual-stacked LCDs, in which the front screen displays a pinhole array, and the pixels in the front screen are limited to binary values.

FIG. 1 shows a conventional (prior art) parallax barrier display. The front panel contains a uniform grid of slits or pinholes. The viewer sees each pixel on the rear panel through this grid, selecting a subset of visible pixels depending on viewer location. A uniform backlight, located behind the rear layer, enables the rear layer to act as a conventional 2D display.

Figure 2:
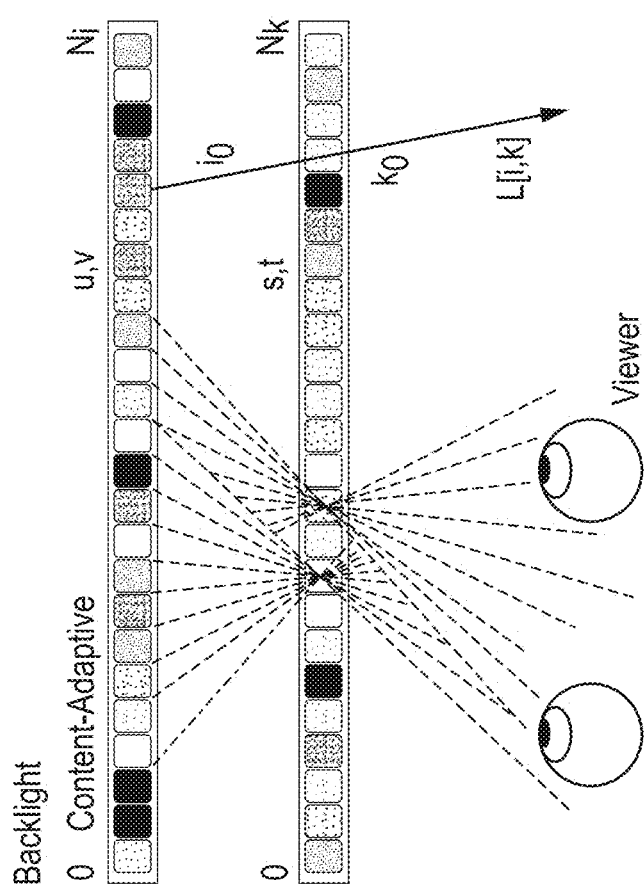
FIG. 2 shows an exemplary implementation of this invention, in which pixels in both screens can take on any value, and both screens can display any arbitrary image.

FIG. 2 is a diagram of an example of this invention. In this example, the dual-stacked LCDs are general spatial light modulators that act in concert to recreate a target light field by attenuating rays emitted by the backlight. Unlike conventional barriers, both masks can exhibit non-binary opacities.

In exemplary implementations of this invention, content-adaptive parallax barriers are employed. Display elements are optimized for multi-view content. The resulting generalized parallax barriers significantly differ from existing heuristics (e.g., grids of slits or pinholes) and allow increased optical transmission and refresh rate, while preserving the fidelity of displayed images. These novel displays can adapt to viewer position.

In some implementations of this invention, prefiltered multi-view content is used.

According to principles of this invention: (1) any 4D light field emitted by a fixed pair of masks can be modeled by the tensor product of two 2D masks, (2) a 1D mask pair only achieves a rank-1 approximation of a 2D light field, modeled by the outer product of the masks; (3) higher-rank approximations may be achieved using temporal multiplexing of mask pairs; (4) time-multiplexed light field display using dual-stacked LCDs may be cast as a matrix approximation problem, (5) a dynamic set of 2D mask pairs, optimized for a given 4D light field, may display content-adaptive parallax barriers, (6) these masks allow compression of the light field into a reduced set of mask pairs, increasing the effective display refresh rate and reducing perceptible flicker, and (7) to obtain physically-realizable masks, optimized for a given viewer position, non-negative matrix factorization (NMF) may be employed to minimize the weighted Euclidean distance between a target light field and that projected by a dual-stacked LCD.

In exemplary implementations, this invention has many benefits: Users do not require special eyewear. Full-resolution 2D display can be restored by setting one LCD to be fully-transparent. Content adaptation increases spatial resolution through temporal multiplexing of mask pairs, exploiting the trend of increasing LCD refresh rates. The dual-stacked masks adapt to the target light field to further increase display brightness. Arbitrary viewing regions are supported, outside of which the reconstruction is unconstrained.

Figure 3:
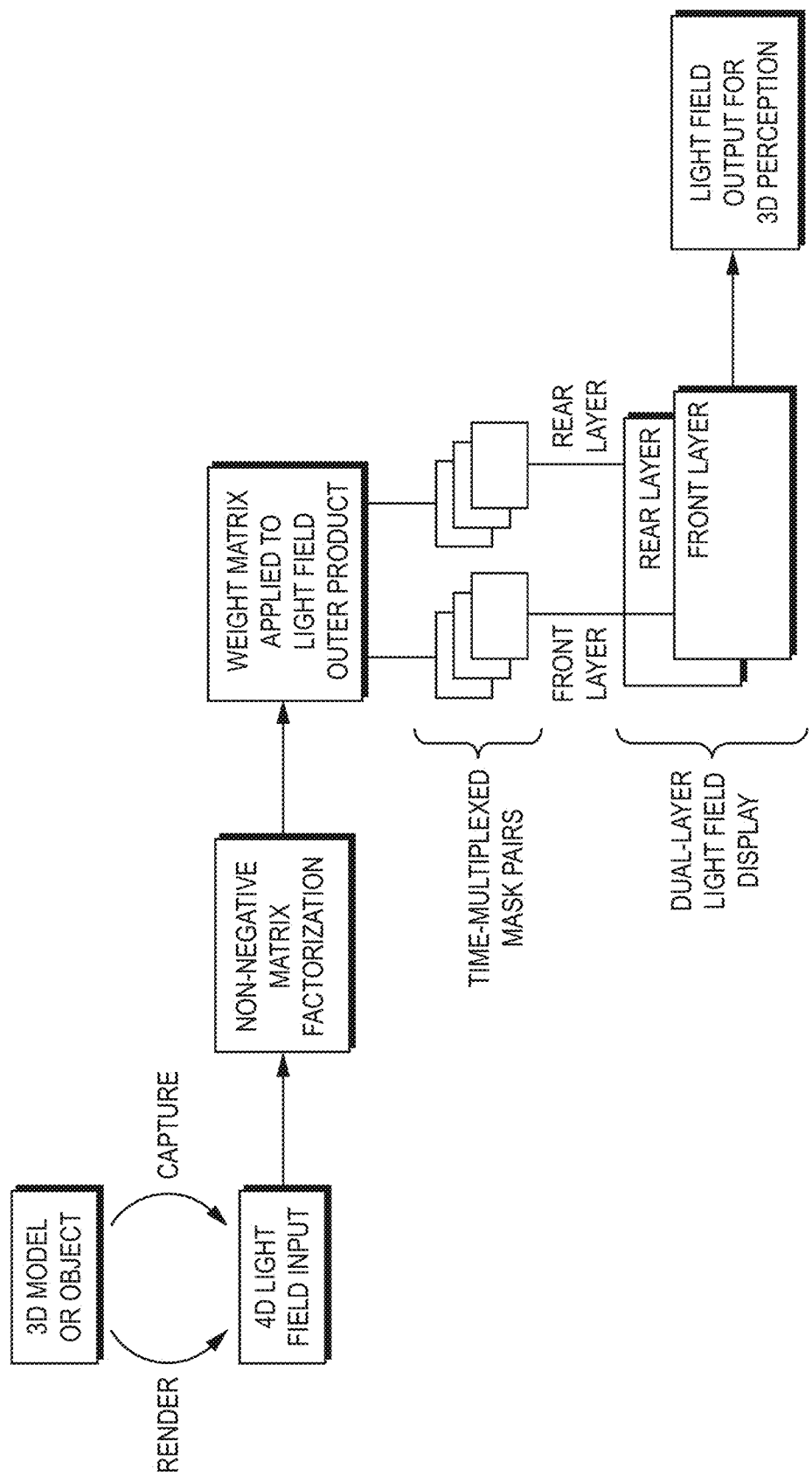
FIG. 3 is a high level flow chart of a numerical method for producing a dual-layer display.

FIG. 3 is a high level flow chart of a numerical method for producing a dual-layer display, in an exemplary implementation of this invention. As shown in FIG. 3: A thin, dual-layer display (e.g., a dual-stacked LCD) allows depth perception without special eyewear. Multi-view content is rendered or photographed and represented as a 4D light field. Content-adaptive parallax barriers are obtained by applying non-negative matrix factorization to the input light field, increasing display brightness and refresh rate compared to conventional barriers. These mask pairs are displayed using the dual-layer display, emitting a low-rank approximation of the input light field and enabling depth perception.

Figure 4:
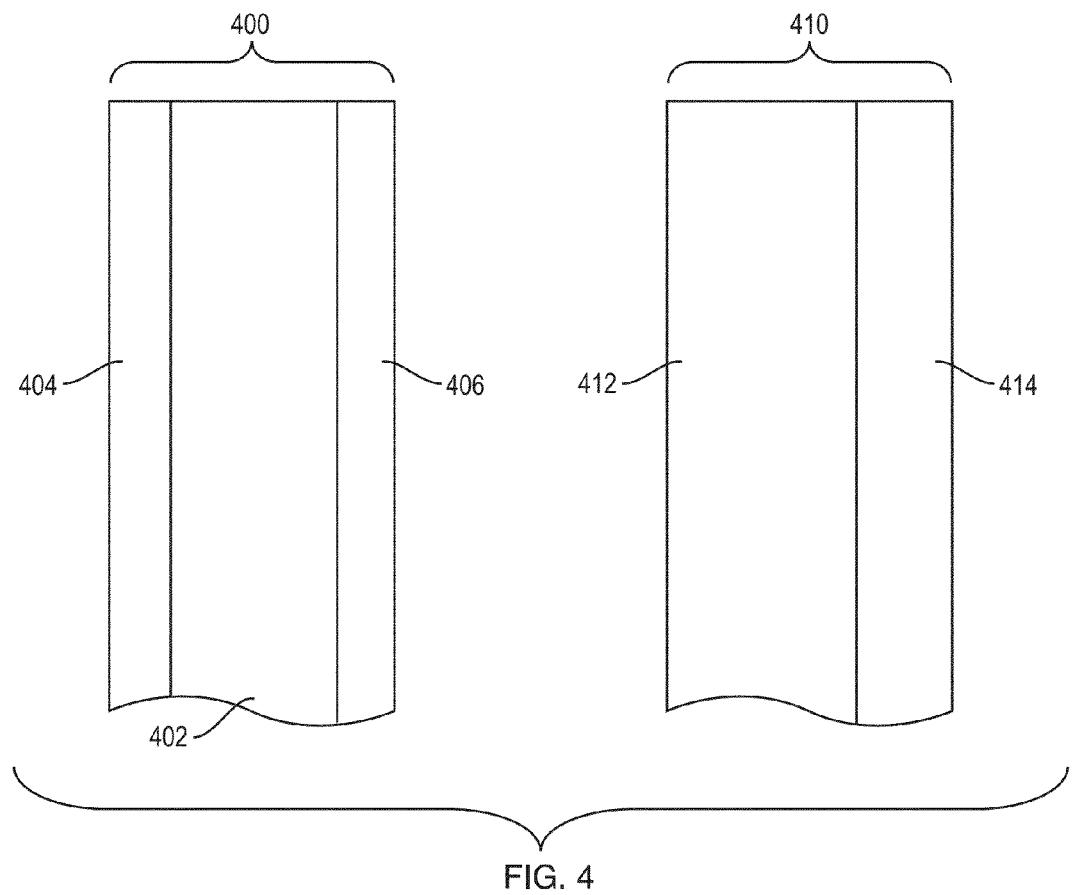
FIG. 4 is a diagram showing a side view of dual-stacked LCDs.

FIG. 4 is a diagram showing a side view of dual-stacked LCDs, in a prototype of this invention. Rear LCD screen 400 is a standard off-the-shelf LCD screen comprising a rear transparent polarizing film 404, an LCD panel 402, and a front polarizing diffuser 406. The backlight is not shown. Front LCD screen 410 is a standard off-the-shelf LCD screen with an LCD panel 412. It has been modified by removing its backlight and rear transparent polarizing film, and by replacing the front polarizing diffuser with a transparent polarizing film 414.

Figure 5:
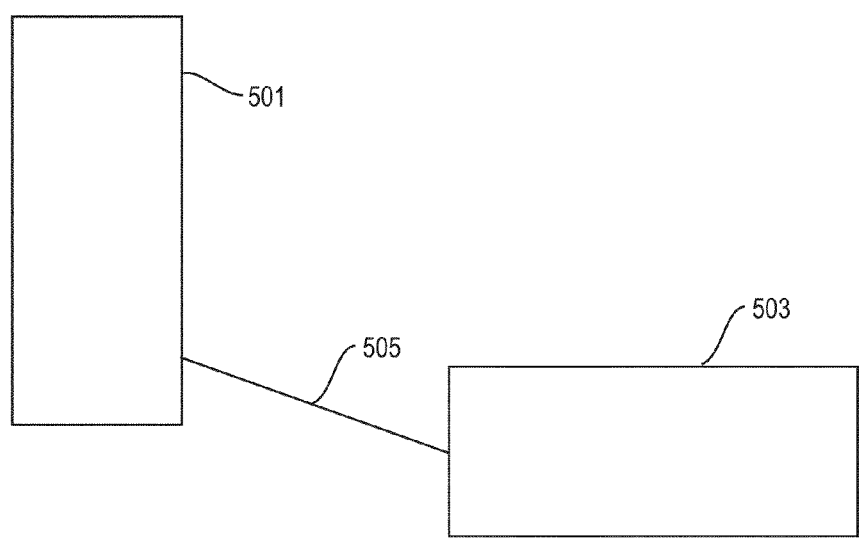
FIG. 5 is a high level block diagram of hardware included in a prototype.

FIG. 5 is a high level block diagram of hardware included in a prototype. A dual-stacked LCD 501 displays a 3D image. One or more processors 503 perform computations, including rendering and numerical calculations of optimized approximations (e.g., using NMF and multiplicative update). For example, the processors 505 may compute time-multiplexed optimal 2D images, and may output command signals for the front and rear LCDs to display these images. The processors 503 are connected to the dual-stacked LCDs by one or more connections 505, which connections may be wired or wireless. Depending on the particular implementation, the location of the one or more processors 503 may vary. For example, the one or more processors may all be remote from the dual-stacked LCDs. Or, for example, at least some of the one or more processors may be housed with, or adjacent to, the dual-stacked LCDs.

In exemplary implementations of this invention, dual-stacked LCDs are used as general spatial light modulators. These two screens act in concert to recreate a light field by attenuating rays emitted by the backlight. Although any fixed pair of masks only creates a rank-1 approximation of a light field, higher-rank approximations are achieved with time multiplexing. 3D display with dual-stacked LCDs is optimized using a matrix approximation framework. This leads to content-adaptive parallax barriers allowing brighter displays with increased refresh rates.

The following discussion of light fields and dual-stacked LCDs will help in understanding this invention:

A general parallax barrier display, containing two mask layers and a backlight, can be analyzed as a light field display device. As shown in FIGS. 1 and 2, an emitted ray is parameterized by the coordinates of its intersection with each mask layer. In an absolute two-plane parameterization of the 4D light field, the ray (u,v,s,t) intersects the rear mask at the point (u,v) and the front mask at the point (s,t), with both mask coordinate systems having an origin in the top-left corner.

In a practical automultiscopic display one is primarily concerned with the projection of optical rays within a narrow cone perpendicular to the display surface (see FIG. 2), since most viewers will be located directly in front of the device. The distinct images viewable within this region are referred to as the "central views" projected by the display. As a result, a relative two-plane parameterization proves more convenient to define a target light field; in this parameterization, an emitted ray is defined by the coordinates (u,v,a,b), where (u,v) remains the point of intersection with the rear plane and (a,b) denotes the relative offset of the second point of intersection such that (a,b)=(s−u,t−v). A 2D slice of the 4D light field, for a fixed value of (a,b), corresponds to a skewed orthographic view (formally an oblique projection).

A general pair of 2D optical attenuation functions, f(u,v) and g(s,t), is defined with the absolute parameterization. These functions correspond to the rear and front masks, respectively. The emitted 4D light field L(u,v,s,t) is given by the product $$L(u,v,s,t)=f(u,v)g(s,t) \qquad (1)$$

assuming illumination by a uniform backlight.

In practice, the masks and the emitted light field are discrete functions. The discrete pixel indices are denoted as (i,j,k,l), corresponding to the continuous coordinates (u,v,s,t), such that the discretized light field is L[i,j,k,l] and the sampled masks are f[i,j] and g[k,l]. When considering only a 2D slice of the 4D light field, the resulting 2D light field matrix L[i,k] is given by the outer product $$L[i,k]=f[i] \otimes g[k]=f[i]g^T[k] \qquad (2)$$

with the masks represented as column vectors f[i] and g[k]. Note that Equation 1 can be compactly expressed as an outer product only by adopting an absolute two-plane parameterization.

For 4D light fields, Equation 2 can be generalized so the light field is given by the tensor product of the 2D masks as follows.

$$L[i,j,k,l]=f[i,j] \otimes g[k,l] \qquad (3)$$

From Equation 2 it is clear that a fixed pair of 1D masks can only produce a rank-1 approximation of any given 2D light field matrix. Similarly, a fixed pair of 2D masks also produces a rank-1 approximation of the discrete 4D light field tensor via Equation 3. This restriction provides an important insight into the inherent limitations of parallax barrier displays. The rank of a synthetic or captured light field is typically greater than one (except for the special case when all objects appear in the plane of the display). Thus, dual-stacked LCDs employing fixed mask pairs produce rank-deficient approximations. However, perceptually-acceptable approximations can be obtained using conventional parallax barriers, at the cost of decreasing the achievable spatial resolution and image brightness.

A conventional parallax barrier display employs a heuristic front mask given by $$g_{pb}[k,l] = \begin{cases} 1 & \text{if } k \bmod N_h = 0 \text{ and } l \bmod N_v = 0, \\ 0 & \text{otherwise,} \end{cases} \qquad (4)$$

where $N_h$ and $N_v$ are the number of skewed orthographic views along the horizontal and vertical display axes, respectively.

Thus, in a conventional parallax barrier display, the front mask is either a uniform grid of slits or pinholes. Under this definition, the rear mask f[i,j] is defined such that Equation 3 is satisfied for every ray passing through a non-zero outer mask pixel; thus, the rear mask is given by $$f_{pb}[i,j]=L[i,j,N_h \lfloor i/N_h \rfloor, N_v \lfloor j/N_v \rfloor]), \qquad (5)$$

when the resolutions of the front and rear masks are equal.

In conventional parallax barrier displays, for regions outside the central field of view, periodic replicas of the skewed orthographic views will be projected. These replicas result from viewing neighboring regions of the rear mask through the parallax barrier. While not correctly capturing the true parallax resulting from steep viewing angles, periodic replication remains a beneficial property of conventional parallax barriers, allowing viewers to see perceptually-acceptable imagery outside the central viewing zone.

In theory, conventional parallax barrier displays achieve perfect reconstruction for any light field ray passing through a non-zero front mask pixel (within the central viewing region). However, in these conventional displays, no rays are projected for dark pixels on the front plane. The reconstructed light field will have significant reconstruction errors, when measured using the Euclidean distance between corresponding elements of the target light field. In practice, however, a viewer is separated by a distance that is significantly larger than the slit or pinhole spacing. Spatial low-pass filtering, as performed by the human eye, minimizes perceptual artifacts introduced by parallax barriers (i.e., blending the region between neighboring parallax barrier gaps). As a result, the occluded regions between slits or pinholes are not perceptually significant; however, these occluded regions significantly reduce the display brightness in these conventional displays.

Conventional parallax barriers remain undesirable due to severe attenuation through a slit or pinhole array, as well as reduced spatial resolution of the output light field. Recently, time-shifted parallax barriers have been proposed to eliminate spatial resolution loss. In such schemes, a stacked pair of high-speed LCDs is used to sequentially display a series of translated barriers $g_{pb}[k,l]$ and corresponding underlying masks $f_{pb}[i,j]$. If the complete mask set is displayed at a rate above the flicker fusion threshold, no image degradation will be perceived.

In exemplary implementations of this invention, the concept of temporal multiplexing for parallax barriers is generalized by considering all possible mask pairs rather than the restricted class defined by Equations 4 and 5. Any sequence of T 1D mask pairs creates (at most) a rank-T decomposition of a 2D light field matrix such that $$L[i,k] = \sum_{t=1}^{T} f_t[i] \otimes g_t[k] = \sum_{t=1}^{T} f_t[i] g_t^T[k] \quad (6)$$

where $f_t[i]$ and $g_t[k]$ denote the rear and front masks for frame t, respectively.

In exemplary implementations of this invention, time-multiplexed light field display using dual-stacked LCDs can be cast as a matrix (or more generally a tensor) approximation problem. Specifically, the light field matrix can be decomposed as the matrix product $$L = FG \quad (7)$$

where F and G are $N_i \times T$ and $T \times N_k$ matrices, respectively. Column t of F and row t of G are the masks displayed on the rear and front LCD panels during frame t, respectively.

A similar expression as Equation 6 can be used to approximate 4D light fields as the summation of multiple tensor products of 2D mask pairs as follows:

$$L[i,j,k,l] = \sum_{t=1}^{T} f_t[i,j] \otimes g_t[k,l] \quad (8)$$

In exemplary implementations of this invention, each mask pair $\{f_t[i,j], g_t[k,l]\}$ must be non-negative, since it is illuminated by an incoherent light source (i.e., the rear LCD backlight). A content-adaptive light field factorization $\tilde{L} = FG$ is sought that minimizes the weighted Euclidean distance to the target light field L, under the following non-negativity constraints, such that $$\arg\min_{F,G} \frac{1}{2} \|L - FG\|_W^2, \text{ for } F, G \geq 0, \quad (9)$$

where the reconstruction error is given by $$\frac{1}{2}\|L - FG\|_W^2 = \sum_{ijkl} [W \cdot (L - FG) \cdot (L - FG)]_{ijkl}. \quad (10)$$

Here ○ denotes the Hadamard product for element-wise multiplication of matrices.

In exemplary implementations of this invention (unlike conventional barriers), the field of view can be adapted to one or more viewers by specifying elements of the weight matrix W (i.e., the Euclidean norm will be minimized where W is large). The weight matrix plays an important role, ensuring a low-rank approximation can obtain high reconstruction accuracy by artificially reducing the rank of the target light field. General 4D light fields are handled by reordering as 2D matrices, with 2D masks reordered as vectors, allowing a similar matrix approximation scheme to be applied.

In exemplary implementations of this invention, Equation 9 is solved using non-negative matrix factorization, employing a multiplicative update rule. Initial estimates $\{F, G\}$ are refined as follows.

$$F \leftarrow F \cdot \frac{[(W \cdot L)G^T]}{[(W \cdot (FG))G^T]} \quad G \leftarrow G \cdot \frac{[F^T(W \cdot L)]}{[F^T(W \cdot (FG))]} \quad (11)$$

Examples of the mask pairs produced by the optimization procedure are shown in FIGS. 6A, 6B, 7B, 7C, 9A and 9B. Note that, if Equation 9 was not constrained to weighted, non-negative factorizations, singular value decomposition (SVD) could be applied; however, solving a weighted SVD problem also requires an iterative algorithm with multiple local minima.

In exemplary implementations using Equation 11, the masks are initialized with random values uniformly distributed on [0,1]; alternative strategies, including seeding with conventional parallax barriers, did not yield reconstructions with reduced errors or increased transmission. After each iteration the mask elements are truncated to the range [0,1]. Images displayed on both LCD layers are jointly optimized, independently for each target automultiscopic video frame.

Content-adaptive parallax barriers exhibit predictable structure. Consider the masks shown in FIGS. 6A, 6B, 7B, 7C, 9A and 9B: flowing, fringe-like patterns are consistently observed. Content-adaptive parallax barriers are locally-similar to conventional parallax barriers, but rotated to align to nearby edges in the light field. Intuitively, parallax is only perceived as a viewer moves perpendicular to an edge, thus a rotated local parallax barrier (i.e., an array of slits) is sufficient to project the correct 4D light field in such local regions.

Qualitatively, both the front-panel masks and rear-panel masks exhibit flowing, slit-like barriers aligned perpendicular to the angular gradient of the 4D light field (see FIG. 7), defined using a relative parameterization as $$\nabla_{ab} L(u, v, a, b) = \left( \frac{\partial L}{\partial a}, \frac{\partial L}{\partial b} \right) \quad (12)$$

The existence of local parallax barriers in content adaptive displays gives intuition into the benefits of such displays. Unlike 2D pinhole arrays, content adaptation can create 1D slits that transmit more light. Consider $N_h \times N_v$ views of a sphere. With pinholes, each front mask is a grid of $N_h \times N_v$ tiles with one transparent pixel. We create local barriers following the angular gradient (e.g., the sphere boundary). Near discontinuities each $N_h \times N_v$ block of the front mask contains slits with an average of no less than $\min(N_h, N_v)$ transparent pixels. Thus, the average achievable brightness increase is $\min(N_h, N_v)$. One significant benefit of content-adaptive parallax barriers (in exemplary implementations of this invention) is to allow simultaneous horizontal and vertical parallax, while preserving the brightness of conventional parallax barriers (i.e., arrays of slits) that support horizontal-only parallax.

In exemplary implementations of this invention, in certain areas of each of the two masks, a rotation of slits occurs, as follows: in these areas, (1) local parallax barriers are displayed; (2) these local parallax barriers are ribbon-like in appearance, (3) each such barrier comprises many small slits, and (4) these small slits tend to be rotated perpendicular to the local angular gradient of the target light field.

This rotation occurs in areas of a mask that correspond to areas of the 3D image that are adjacent to a depth discontinuity (step function) and are not adjacent to a sharp corner. The angular gradient in such an area is strong and single-valued. (In contrast, (a) if a depth discontinuity is not present, the angular gradient of the light field tends not to be strong, and (b) adjacent to a sharp corner, the angular gradient is not single-valued.)

In areas of a mask that correspond to areas of the 3D image that are adjacent to a depth discontinuity (step function) and are not adjacent to a sharp corner, the slits tend to be perpendicular to the angular gradient of the target light field, and tend to be parallel to the step edge.

In exemplary implementations, if a majority of the slits in a region of a local parallax barrier in a mask are oriented within 10 degrees of parallel to each other, then a majority of the slits in that region are oriented within 20 degrees of perpendicular to the angular gradient of the target light field.

Here are two examples of how slits in local parallax barriers may be rotated, in exemplary implementations of this invention:

First Example

A contiguous area in a mask (e.g., a front or rear mask) corresponds to a region of the target 4D light field that is adjacent to a depth discontinuity. In that area, the target 4D light field has an angular gradient. In that area, a local parallax barrier is displayed, which local parallax barrier comprises a set of more than ten slits, a majority of the slits having an orientation within 15 degrees of perpendicular to the angular gradient. Alternately, in this example, the number of slits in the set may be more than five, more than 15, more than 25, more than 50, or more than 100. Alternately, in this example, the orientation may be within 1 degree, within 5 degrees, within 10 degrees, or within 20 degrees, of perpendicular to the angular gradient.

Second Example

In this second example, there are 7×7 views in the target light field. Choose a random pixel in an area of one of the masks that corresponds to a region of the target 3D image that is adjacent to a depth discontinuity and that is not adjacent to a sharp corner. In this area of the mask, the angular gradient of the light field is strong and single-valued. In this area, a local parallax barrier will place a slit at or very close to this pixel; specifically, if then the slit will be within +/−3 pixels of the pixel under consideration. The direction of the slit will be aligned, within +/−20 degrees, of the instantaneously angular gradient of the target light field evaluated at that point. If the angular gradient is not "well defined" at that point (i.e., does not have a strong, dominant direction), then the optimization will not produce a slit, but some other pattern.

Figure 6A:
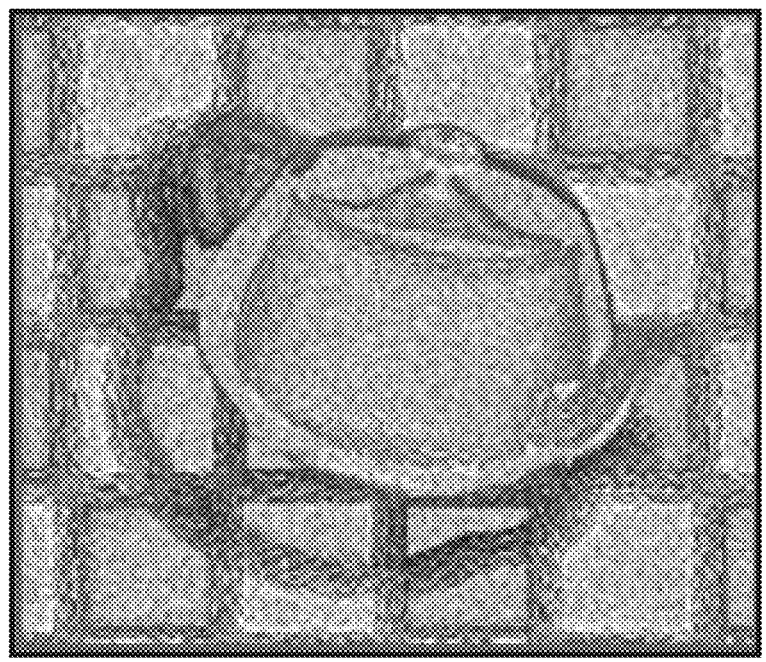
FIGS. 6A and 6B show a rear-panel mask and a front-panel mask.
Figure 6B:
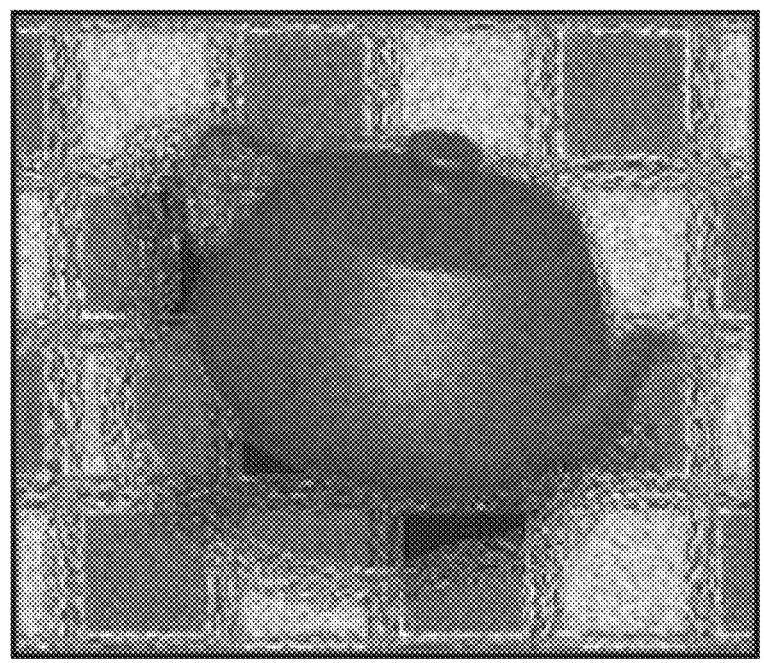

FIGS. 6A and 6B show an example of a rear-panel mask and a front-panel mask, in a prototype of this invention.

Figure 7C:
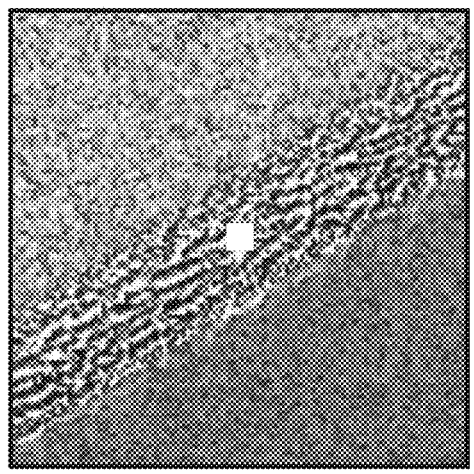
FIGS. 7B and 7C shows a rear-panel mask and a front-panel mask, respectively, produced by a rank-9 decomposition. Optimization produces local parallax barriers, rotated to align with the step edge.
Figure 7B:
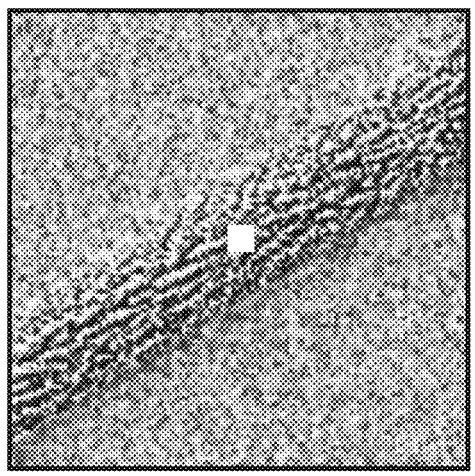
Figure 7A:
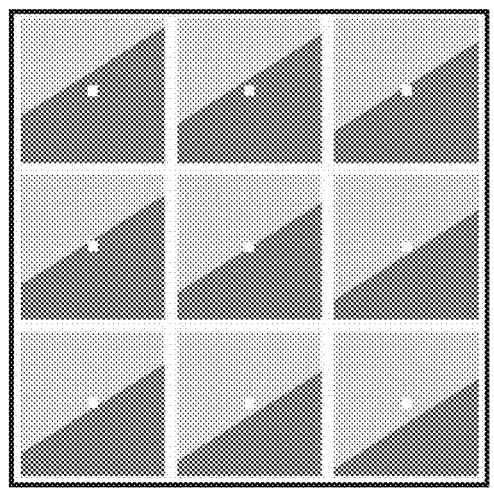
FIG. 7A shows oblique projections of a step edge.

FIGS. 7A, 7B and 7C show a region centered on a depth discontinuity, in a prototype of this invention. Locally, the scene is modeled by two fronto-parallel planes (i.e., a step edge). A 4D light field, containing 3×3 oblique projections, is rendered so the disparity between projections is 10 pixels. The front-panel masks contain perturbed lines that run parallel to the edge (i.e., perpendicular to the angular gradient). Their average spacing equals the angular resolution (3 pixels) and they span a region equal to the product of the disparity and the number of views minus one (±10 pixels from the edge). The masks exhibit random noise away from the edge, approximating a scene without parallax. Equation 11 converges to a local stationary point, but not necessarily the global minimum; as a result, the observed local parallax barriers possess some randomization due to convergence to a local minima.

FIG. 7A shows oblique projections of a step edge seen as a viewer moves in similar directions from the center (e.g., the image in the top left of FIG. 7A would be seen as the viewer's head moves from the center to the top left of the screen, the image in the top right of FIG. 7A would be seen as the viewer's head moves from the center to the top right of the screen, and so on.) FIGS. 7B and 7C shows a rear-panel mask and a front-panel mask, respectively, produced by a rank-9 decomposition. Optimization produces local parallax barriers, rotated to align with the step edge. In both FIGS. 7B and 7C, a local parallax barrier runs diagonally from the upper left to the lower right of the Figure.

Figure 8:
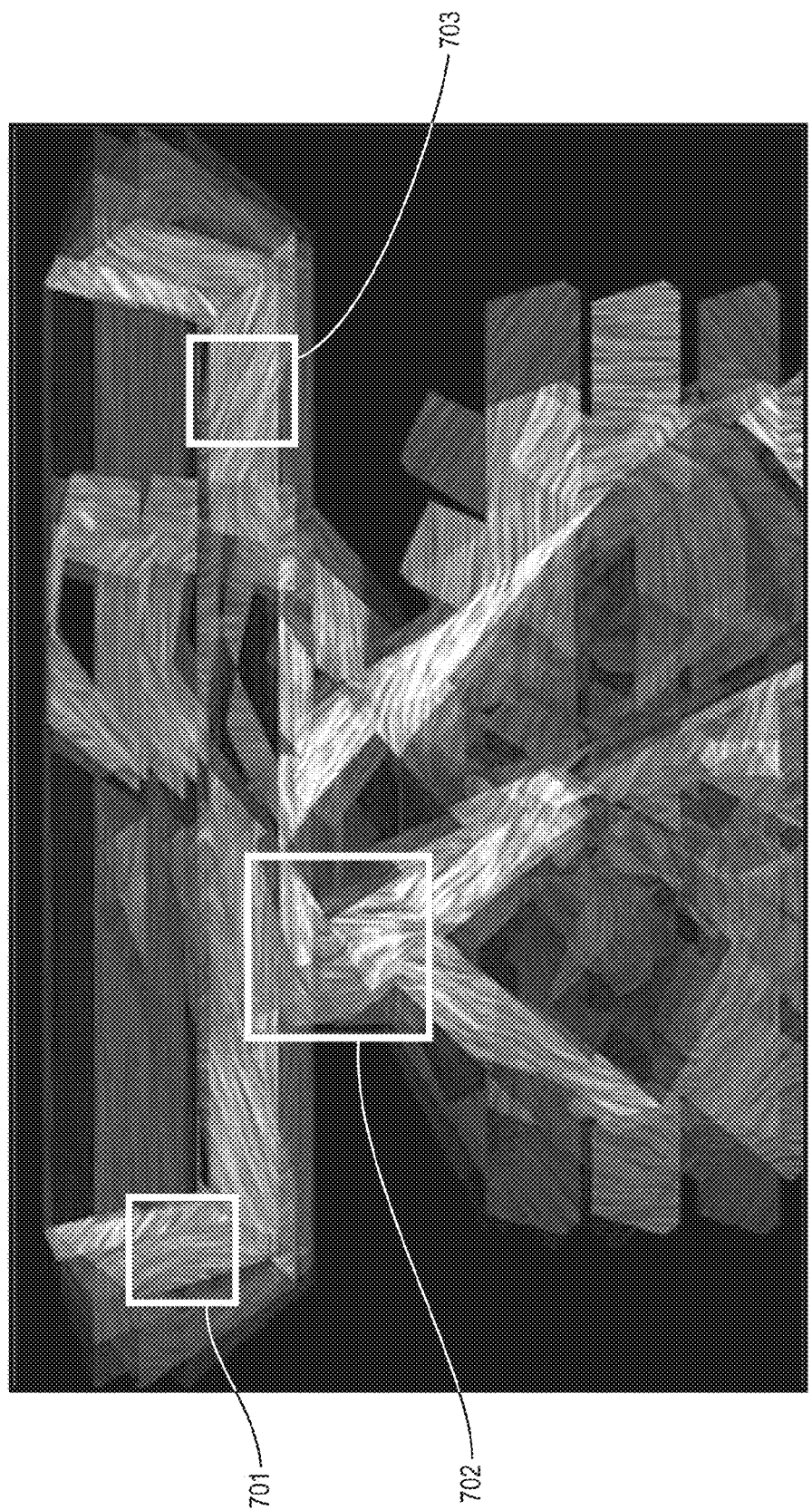
FIG. 8 shows streamlines of the angular gradient of a light field for a scene with three stacked balls. The streamlines are visualized using line integral convolution.

FIG. 8 shows streamlines of the angular gradient of a light field for a scene with three stacked balls. The streamlines are visualized using line integral convolution. For ease of reference, each time that rectangle 701 appears in FIGS. 8, 9A, 9B, 10A and 10B, it indicates the same area (likewise, rectangles 702 and 703 indicate the same area, respectively, each time that they appear in those Figures.)

Figure 9A:
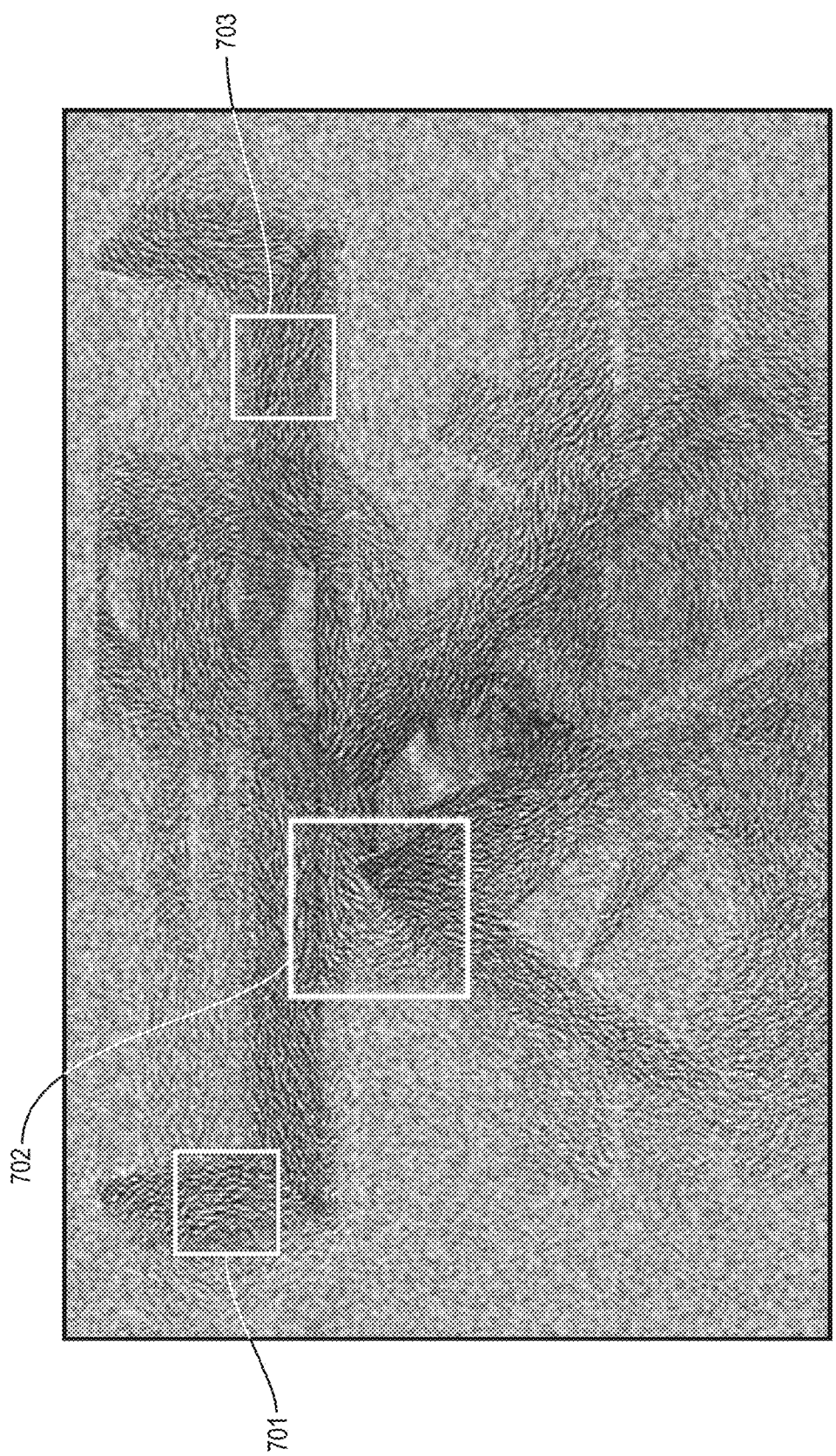
FIGS. 9A and 9B show a rear-panel mask and a front-panel mask, respectively, in an exemplary implementation of this invention. This pair of content-adaptive masks produces a 3D image of the stacked balls scene. To enhance the visibility of the local parallax barriers, only the luminance channel of the light field is processed.
Figure 9B:
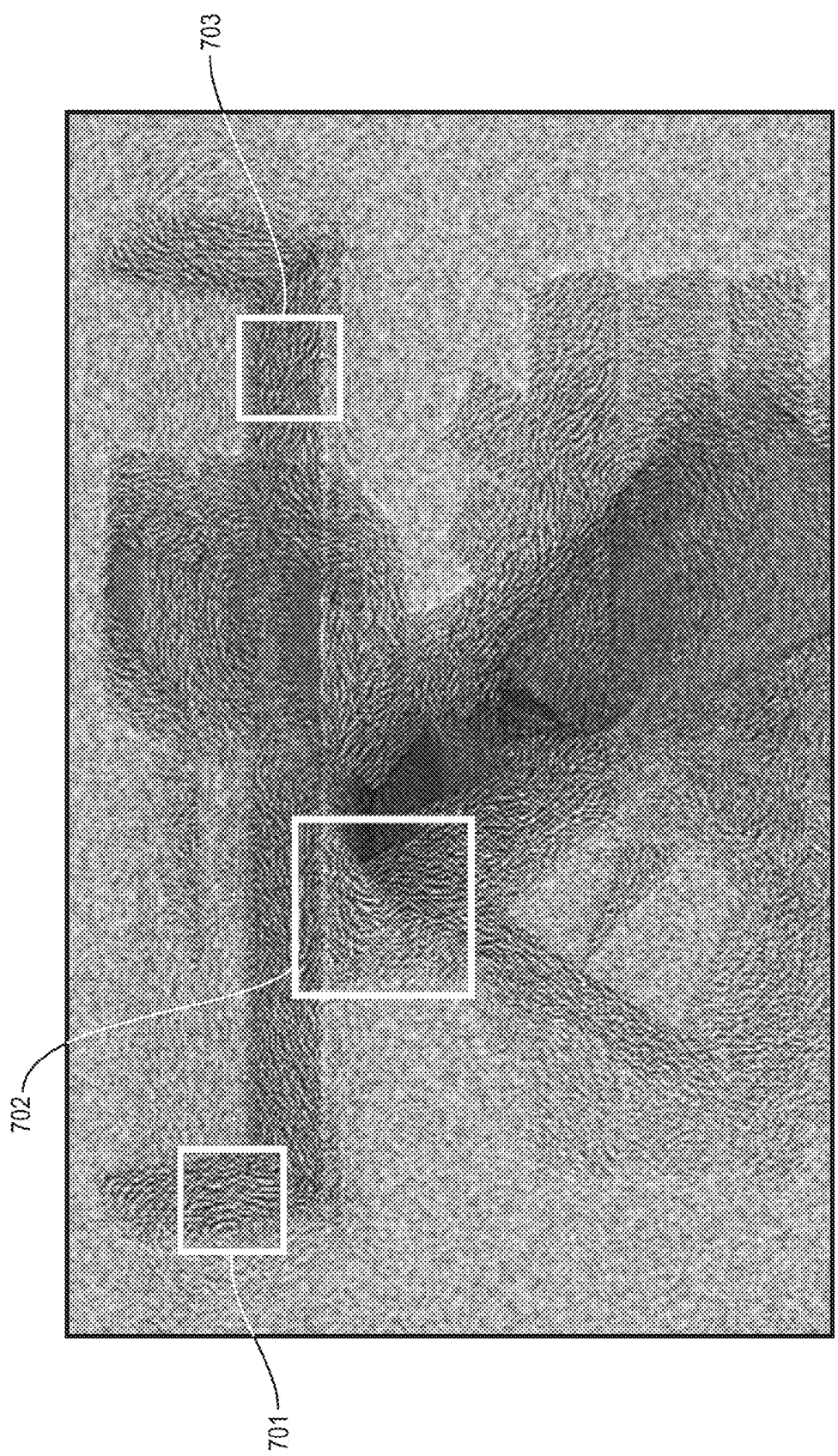

FIGS. 9A and 9B show a rear-panel mask and a front-panel mask, respectively, in a prototype of this invention. This pair of content-adaptive masks produces a 3D image of the stacked balls scene. To enhance the visibility of the local parallax barriers, only the luminance channel of the light field is processed. In rectangle 703 in FIGS. 9A and 9B, a local parallax barrier runs horizontally from the left side to the right side of the rectangle. In the upper portion of rectangle 701 in FIGS. 9A and 9B, a local parallax barrier is oriented vertically. In each case in FIGS. 9A and 9B, the local parallax barrier comprises many small slits.

Figure 10A:
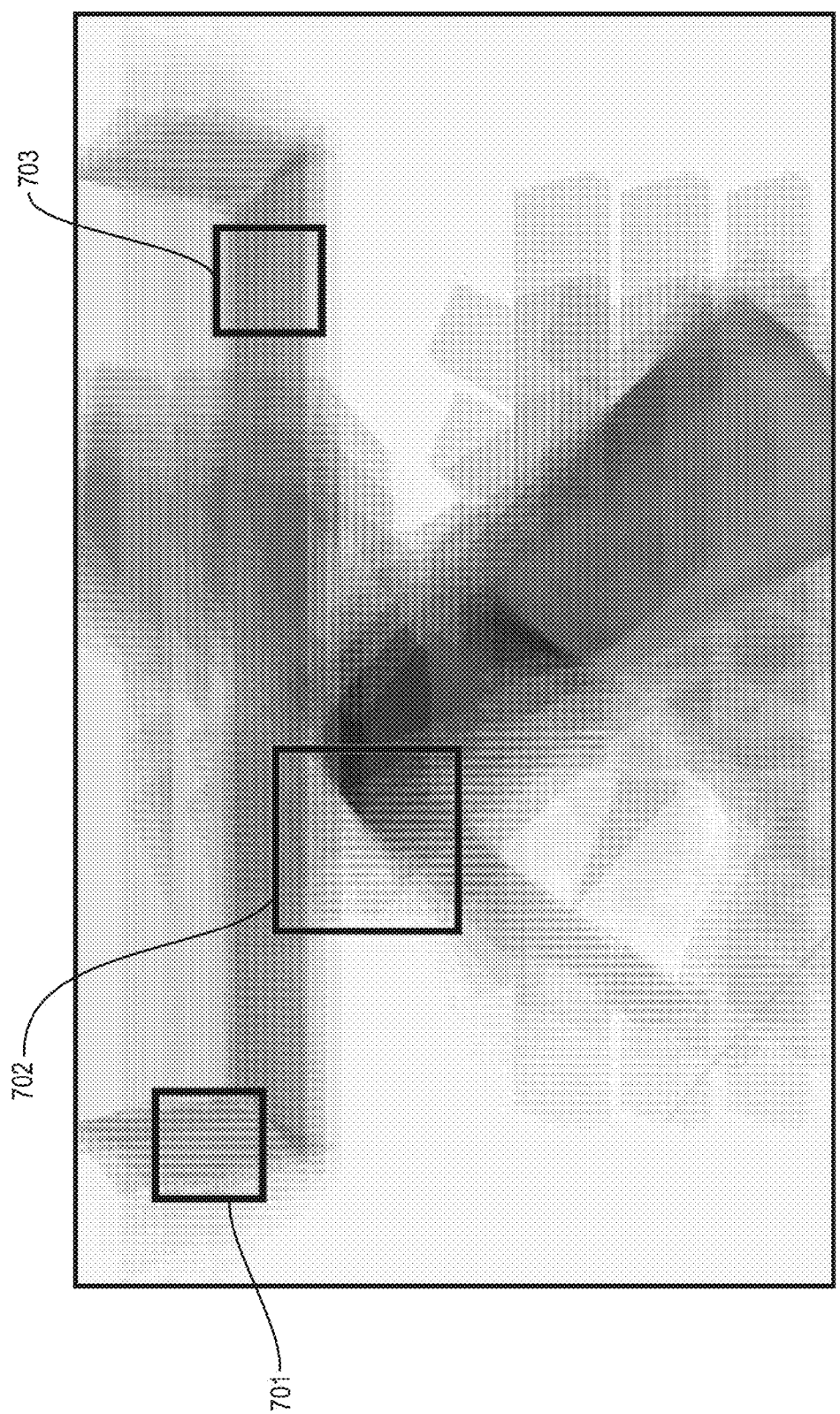
FIGS. 10A and 10B shows a rear mask and front mask, respectively, in a conventional parallax barrier mask pair. This pair of conventional (prior art) masks also produce a 3D image of the stacked balls scene. For comparison with FIGS. 8A and 8B, only the luminance of the light field is processed.
Figure 10B:
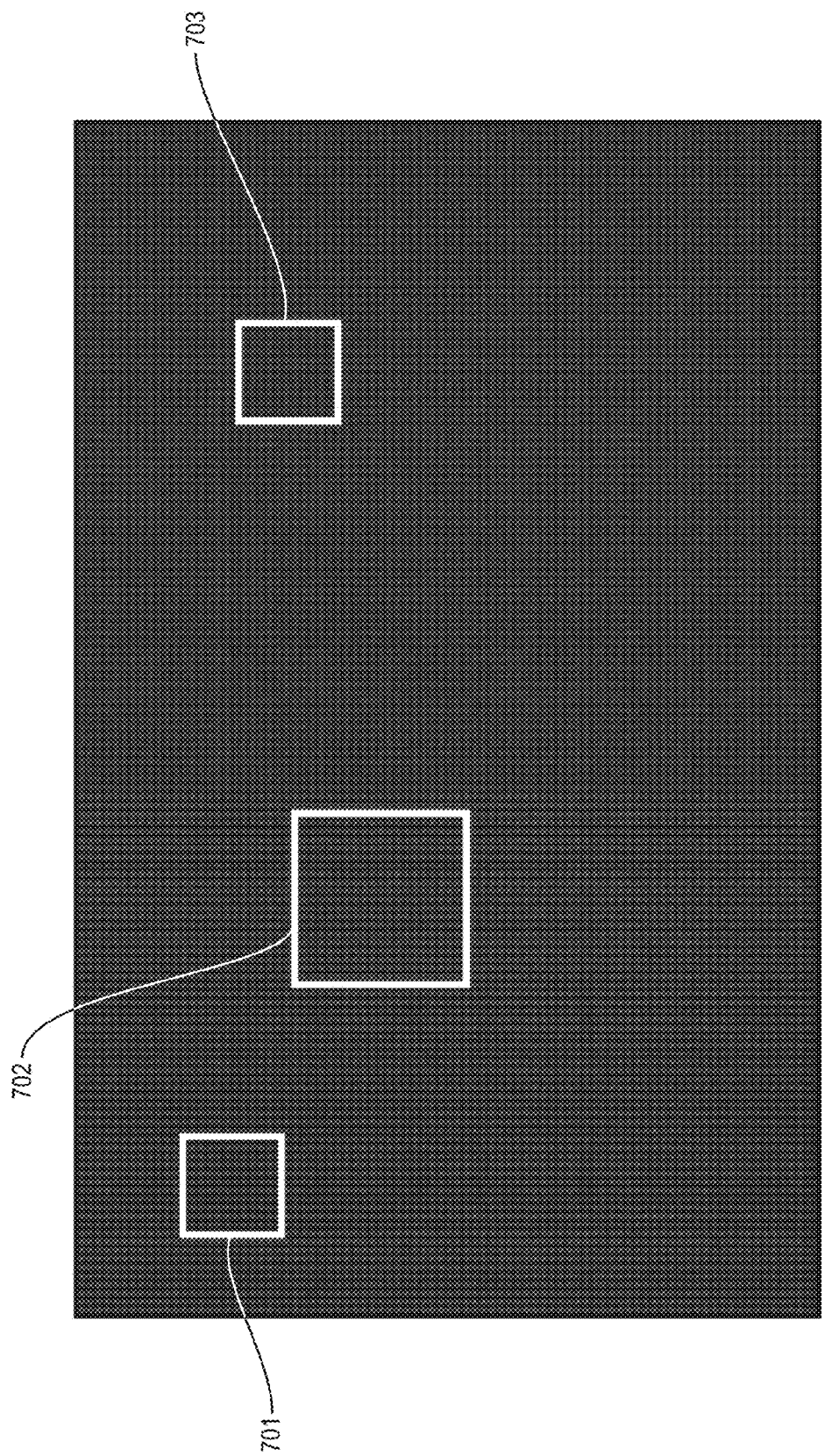

FIGS. 10A and 10B shows a rear mask and front mask, respectively, in a conventional parallax barrier mask pair. This pair of conventional (prior art) masks also produce a 3D image of the stacked balls scene. For comparison with FIGS. 8A and 8B, only the luminance of the light field is processed.

In a prototype of this invention, a dual-stacked LCD was constructed using a pair of 1680×1050 Viewsonic®

FuHzion® VX2265wm 120 Hz LCD panels. The panels have a pixel pitch of 282 μm and are separated by 1.5 cm. However, masks are displayed at half the native resolution. Thus, for a typical light field with an angular resolution $N_h \times N_v$ of 5×3 views, the prototype supports an 11°×7° field of view; a viewer sees correct imagery when moving within a frustum with similar apex angles.

The rear layer is an unmodified panel, whereas the front layer is a spatial light modulator (SLM) fashioned by removing the backlight from a second panel. The front polarizing diffuser and rear polarizing film are removed. The front polarizing diffuser is replaced with a transparent polarizer, restoring the spatial light modulation capability of the panel. Without such modifications, the polarizers in the front panel completely attenuate light polarized by the rear panel. Eliminating the redundant rear polarizer of the front panel increases light transmission. The LCD panels are driven separately via DVI links from a dual-head NVIDIA® Quadro® FX 570 display adapter, automatically synchronizing the display refreshes.

This prototype can time-multiplex up to eight mask pairs at 15 Hz. Time multiplexing five mask pairs achieves a 24 Hz refresh (a frame rate used by typical cinematic projection systems). Thus, the prototype achieves an effective frame rate, despite temporal multiplexing, near or above the human flicker fusion threshold.

In this prototype, light fields are rendered with POV-Ray and masks are represented by a series of texture pairs. Each color channel is factorized independently. The displays are driven at 120~Hz with a custom OpenGL® application. Gamma compression is applied to ensure mask intensity varies linearly with the encoded value; a gamma value of $\gamma=2.2$ was measured for our LCDs. Mask optimization uses a multi-threaded C++ implementation written with the POSIX® Pthreads API; a single-threaded version is provided with the supplementary code. An Intel Xeon® 8-core 3.2 GHz processor with 8 GB of RAM is used for optimization and display. For a typical light field with 5×3 views, each with a resolution of 840×525 pixels, the optimization takes approximately 10 seconds per iteration. In practice, at least 50 iterations are required for the PSNR to exceed 30 dB.

Preferably, the target light field is prefiltered to prevent aliasing.

Content adaptation can also increase the effective refresh rate of the automultiscopic display. Consider the prototype described above, which supports a native 120 Hz refresh rate. In this case, only five masks can be time-multiplexed before the effective refresh rate drops below 24 Hz and flicker becomes readily apparent.

Fortunately, content-adaptive parallax barriers allow the light field to be compressed using a set of $T<N_h N_v$ mask pairs. Theoretically, rank-1 light fields occur in a single case: when a textured plane is displayed in the plane of the rear LCD panel (i.e., for a light field without any parallax). Rank grows (to the number of views $N_h N_v$) as the plane is translated away from the rear LCD.

In exemplary implementations of this invention, a trade-off can be made among automultiscopic display brightness, refresh rate, and reconstruction error.

Viewing one LCD through another can cause visible fringes (moiré) to appear. In the prototype discussed above, to solve this problem, a thin paper vellum sheet is placed against the rear LCD. The diffuser eliminates moiré, however the image resolution is reduced from 1680×1050 to 840×525. Alternately, a custom diffuser, with a properly-selected point spread function, would prevent this reduction. Preferably, the diffuser should only blur neighboring color subpixels—minimizing moiré while preserving spatial resolution.

Each LCD color filter transmits a range of wavelengths. The relative transmission, as a function of wavelength, is known as the color filter transmission spectrum. The transmission spectra exhibit some overlap in some commercial panels. In the prototype, visible color-channel crosstalk is ignored, while allowing independent decompositions for each channel, this simplification results in visual artifacts. Alternately (and preferably), the transmission spectra can be designed with minimal overlap.

In the prototype, to minimize crosstalk for grayscale regions, each color channel is initialized with the same random set of values. The deterministic optimization algorithm leads to grayscale masks that minimize crosstalk in these regions.

Humans perceive an intermittent light source as steady when it varies between 16-60 Hz, depending on illumination conditions. For dim stimuli in darkened rooms, 16 Hz is a commonly-accepted lower bound.

The prototype can multiplex up to eight mask pairs at 15 Hz. Multiplexing five mask pairs achieves a 24 Hz refresh (a frame rate used in cinematic projection). However, 240 Hz LCDs are commercially available and allow doubling the decomposition rank without altering the refresh rate. Thus, this invention may benefit from the trend of LCDs with increased refresh rates.

In some implementations, masks are precomputed for displaying dynamic content.

In exemplary implementations, the weight matrix may be used to achieve a wide range of effects. For example, weights can be selected to support multiple viewers or a wider field of view.

In exemplary implementations of this invention, higher frame rates result in improved image quality. The human eye can be assumed to have an average "frame rate" of 60 Hz. Thus, if 240 Hz display is used, then 240/60=4 frames can be displayed over the "exposure time" of the eye—yielding a rank-4 display. Since higher rank yields less compression error, this produces a higher PSNR (peak signal-to-noise ratio) image. But, all four frames must be averaged by the eye, so this reduces the "effective frame rate" of the 240 Hz display to only 60 Hz. If you had a 600 Hz display, then a rank-10 approximation could be achieved with very high PSNR at an effective refresh rate of 60 Hz. (Thus, in exemplary embodiments, this invention may be used to advantage in a high-speed display.) Or, for example, a 600 Hz display in a rank-3 mode with a 200 Hz refresh may be used, although PSNR would lower.

DEFINITIONS AND CLARIFICATIONS

Here are some definitions and clarifications. As used herein:

The "angular gradient" of a 4D light field is defined using a relative two plane parameterization as $$\nabla_{ab} L(u, v, a, b) = \left(\frac{\partial L}{\partial a}, \frac{\partial L}{\partial b}\right) \tag{12}$$

For purposes of this definition (and as discussed above): (1) in an absolute two plane parameterization, an emitted ray is parameterized by the coordinates of its intersection with each mask layer; (2) the ray (u,v,s,t) intersects the rear mask at the point (u,v) and the front mask at the point (s,t), with both mask coordinate systems having an origin in the top-left corner, and (3) in a relative two-plane parameterization, a ray is defined by the coordinates (u,v,a,b), where (u,v) remains the point of intersection with the rear mask and (a,b) denotes the relative offset of the second point of intersection (i.e., the point of intersection with the front mask) such that (a,b)=(s−u,t−v). Angular gradient (and orientation of a slit in a mask) are evaluated "instantaneously" at a given point.

A "multi-view automultiscopic display with full motion parallax" means display of a 3D image with vertical motion parallax and horizontal motion parallax, which display does not require a viewer to wear any glasses or other optical apparatus, and which image includes multiple views, the view seen depending on the angle at which the image is viewed.

In the context of LCD screens or other display screens, "front" is closer to a viewer than "rear".

The term "include" shall be construed broadly, as if followed by "without limitation".

The term "or" is an inclusive disjunctive. For example "A or B" is true if A is true, or B is true, or both A or B are true.

"Parallax" includes binocular parallax and motion parallax. In binocular parallax, the apparent position of an object viewed by the left eye and the right eye differs because of the different positions of the two eyes. In motion parallax, the apparent position of an object appears to change as the viewpoint moves (e.g., by moving one's head).

"Parallax barriers" means slits, pinholes or other patterns for producing parallax in a 3D image.

Variants:

This invention may be implemented in many different ways. Here are a few examples:

Parallax barriers are not limited to periodically spaced slits or a regular grid or array of pinholes. Parallax barriers may be irregular in shape, may be straight or curved, and may be arranged in irregular, non-evenly spaced patterns.

Parallax barriers may be displayed by an LCD, other electronic screen for light transmission, fixed mask, or other dynamic spatial light modulator. For example, the spatial light modulator may be a MEMs shutter device or a MEMS mirror array.

Parallax barriers are not limited to spatial light modulators, at least in the case of a rear screen. Parallax barriers may be displayed by a rear screen that is a source of illumination (e.g., an LED screen, electroluminescent display, plasma display panel, or CRT screen). For example, in a dual-stacked arrangement that is not backlit, the rear screen may be an illumination source and the front screen may be a spatial light modulator. In that case, parallax barriers in the rear screen comprise areas that emit less or no light, and parallax barriers in the front screen comprise areas that transmit less or no light.

This invention may be implemented as a method for producing an actual 4D light field that approximates a target 4D light field, wherein (a) a pair of spatial light modulators is backlit by an incoherent light source, (b) the pair comprises a rear modulator that displays a rear mask and front modulator that displays a front mask, (c) a contiguous area in each of the rear and front masks, respectively, corresponds to a region of the target 4D light field that is adjacent to a depth discontinuity, (d) in that area, the target 4D light field has an angular gradient, (e) in that area, a parallax barrier is displayed, which parallax barrier comprises a set of more than ten slits, a majority of the slits having an orientation within 15 degrees of perpendicular to the angular gradient, and (f) the front and rear masks produce the actual 4D light field, which actual 4D light field comprises a multi-view automultiscopic display with full motion parallax. Furthermore, in this method: (1) the rear and front modulators may display the rear and front masks, respectively, at a frame rate that exceeds 10 Hz, (2) for each frame, the rear and front masks may be jointly optimized by using non-negative matrix factorization to approximately calculate a solution that minimizes the Euclidian distance between the actual 4D light field and the target 4D light field, (3) the non-negative matrix factorization may be computed by one or more processors, starting with randomly initialized values for pixels and iteratively applying a multiplicative update, and (5) light field factorization $\tilde{L}=FG$ may be calculated by one or more processors, where $$\arg\min_{F,G} \frac{1}{2}\|L-FG\|_W^2, \text{ for } F, G \geq 0,$$

where the reconstruction error is given by:

$$\frac{1}{2}\|L-FG\|_W^2 = \sum_{i,j,k,l} [W \cdot (L-FG) \cdot (L-FG)]_{ijkl}.$$

and where
○ denotes a Hadamard product for element-wise multiplication of matrices,
w is the weight of a weighting matrix W,
F and G are $N_i \times T$ and $T \times N_k$ matrices, respectively,
Column t of F and row t of G are the rear and front masks displayed during frame t, respectively,
discrete pixel indices of the rear mask are denoted as (i,j) and discrete pixel indices of the front mask are denoted as (k,l), and
the target light field L, when discretized, is given by L[i,j, k,l].

Furthermore, in this method: (6) initial estimates {F,G} may be iteratively refined as follows.

$$F \leftarrow F \cdot \frac{[(W \cdot L)G^T]}{[(W \cdot (FG))G^T]} \quad G \leftarrow G \cdot \frac{[F^T(W \cdot L)]}{[F^T(W \cdot (FG))]}$$

Furthermore, in this method: (7) the automultiscopic display may have a field of view, and the field of view may be adapted to one or more viewers by specifying elements of the weight matrix W, (8) the spatial light modulators may be LCDs, and (9) a majority of pixels in the front mask can have a range or more than two opacities (and thus not be limited to binary opacities).

This invention may be implemented as a process comprising, in combination: (a) displaying 2D rear masks at a frame rate of at least 10 Hz, and (b) displaying 2D front masks at a frame rate of at least 10 Hz, wherein: the rear masks are displayed by a rear spatial light modulator, the front masks are displayed by a front spatial light modulator, incoherent light from a backlight passes first through the rear modulator and then through the front modulator, a majority of pixels in the front masks are not limited to binary opacities, and, for each frame, the rear and front masks are jointly optimized by using non-negative matrix factorization to approximately calculate a solution that minimizes the Euclidian distance between a 4D light field that is actually produced and a target 4D light that is sought to be produced. Furthermore, in this process: (1) the non-negative matrix factorization may be computed by one or more processors, starting with randomly initialized values for pixels and iteratively applying a multiplicative update, (2) the rear and front masks may produce a multi-view automultiscopic display with full motion parallax, (3) a contiguous area in each of the rear and front masks, respectively, may correspond to a region of the target 4D light field that is adjacent to a depth discontinuity; in that area, the target 4D light field may have an angular gradient; and in that area, a parallax barrier may be displayed, which parallax barrier comprises a set of more than 20 slits, a majority of the slits having an orientation within 10 degrees of perpendicular to the angular gradient, and (4) light field factorization L=FG may be calculated by one or more processors, where $$\arg\min_{F,G} \frac{1}{2} \|L - FG\|_W^2, \text{ for } F, G \geq 0,$$

where the reconstruction error is given by a reconstruction error formula, as follows:

$$\frac{1}{2} \|L - FG\|_W^2 = \sum_{ijkl} [W \cdot (L - FG) \cdot (L - FG)]_{ijkl}.$$

and where
○ denotes a Hadamard product for element-wise multiplication of matrices,
w is the weight of a weighting matrix W,
$\tilde{L}$ can be decomposed as a matrix product, L=FG,
F and G are $N_i \times T$ and $T \times N_k$ matrices, respectively,
Column t of F and row t of G are the rear and front masks displayed during frame t, respectively,
discrete pixel indices of the rear mask are denoted as (i,j) and discrete pixel indices of the front mask are denoted as (k,l), and
the target light field L, when discretized, is given by L[i,j,k,l].

Furthermore, in this process: (5) initial estimates {F, G} may be iteratively refined as follows.

$$F \leftarrow F \cdot \frac{[(W \cdot L)G^T]}{[(W \cdot (FG))G^T]} \quad G \leftarrow G \cdot \frac{[F^T(W \cdot L)]}{[F^T(W \cdot (FG))]}$$

Furthermore, in this process: (6) the automultiscopic display may have a field of view, and the field of view may be adapted to one or more viewers by specifying elements of the weight matrix W.

This invention may be implemented as apparatus comprising, in combination: (a) a pair of spatial light modulators, comprising a rear modulator and a front modulator, for attenuating uncollimated light from a backlight behind the rear modulator, displaying rear masks on the rear modulator at a frame rate of at least 10 Hz and displaying front masks on the front modulator at a frame rate of at least 10 Hz, and (b) at least one processor for performing calculations to jointly optimize, for each frame, the rear and front masks by approximately calculating a solution that minimizes the Euclidean distance between a 4D light field that is actually produced by the front and rear masks and a target 4D light that is sought to be produced, wherein a majority of pixels in the front masks are not limited to binary opacities. Furthermore, in the case of this apparatus: (1) a contiguous area in each of the rear and front masks, respectively, may correspond to a region of the target 4D light field that is adjacent to a depth discontinuity, in that area, the target 4D light field may have an angular gradient, and in that area, a parallax barrier may be displayed, which parallax barrier comprises a set of more than ten slits, a majority of the slits having an orientation within 20 degrees of perpendicular to the angular gradient, and (2) the rear and front masks may produce a multi-view automultiscopic display with full motion parallax.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:
1. A method that comprises a pair of spatial light modulators displaying time-multiplexed mask pairs, wherein:
   (a) the pair of modulators comprises a rear modulator and a front modulator;
   (b) each mask pair comprises a rear mask and a front mask, such that the rear mask is displayed by the rear modulator while the front mask is displayed by the front modulator;
   (c) the pair of modulators generate an auotomultiscopic display;
   (d) light from a backlight passes first through the rear modulator and then through the front modulator;
   (e) the automultiscopic display has a refresh rate of at least 13 Hz; and
   (f) during each refresh of the automultiscopic display, the pair of modulators display a set of time-multiplexed mask pairs that produce a pattern of light that would, if integrated by a viewer's eye, comprise an approximation of a target light field, which approximation has a matrix rank higher than one.
2. The method of claim 1, wherein each of the mask pairs, respectively, produces a light field that is an approximation of the target light field, which approximation has a matrix rank of one.
3. The method of claim 1, wherein method further comprises optimizing the display to minimize Euclidean distance between the target light field and a light field produced by the pair of modulators.
4. The method of claim 3, further comprising performing non-negative matrix factorization to minimize the Euclidean distance.
5. The method of claim 4, wherein the non-negative matrix factorization is weighted.
6. The method of claim 1, wherein the target light field is a 4D light field.
7. The method of claim 1, wherein the display has a refresh rate that is between 13 Hz and 120 Hz.
8. The method of claim 1, wherein the automultiscopic display has that has horizontal motion parallax and vertical motion parallax.
9. The method of claim 1, wherein the spatial light modulators are LCDs.
10. The method of claim 1, wherein each pixel, out of a majority of pixels in the front modulator, varies in opacity over a range, which range includes more than two opacity levels.

11. A method that comprises a pair of spatial light modulators displaying time-multiplexed mask pairs, wherein:
  (a) the pair of modulators comprises a rear modulator and a front modulator;
  (b) each mask pair comprises a rear mask and a front mask, such that the rear mask is displayed by the rear modulator while the front mask is displayed by the front modulator;
  (c) the pair of modulators generate a display that has motion parallax;
  (d) light from a backlight passes first through the rear modulator and then through the front modulator; and
  (e) the pair of modulators display a set of time-multiplexed mask pairs that produce a pattern of light that would, if summed by a viewer's eye, comprise an approximation of a target light field, which approximation has a matrix rank higher than one.

12. The method of claim 11, wherein each of the mask pairs, respectively, produces a light field that is an approximation of the target light field, which approximation has a matrix rank of one.

13. The method of claim 11, wherein method further comprises optimizing the display to minimize Euclidean distance between the target light field and a light field produced by the pair of modulators.

14. The method of claim 13, further comprising performing non-negative matrix factorization to minimize the Euclidean distance.

15. Apparatus comprising a pair of spatial light modulators, which pair of modulators comprises a front modulator and a rear modulator and is configured, when backlit by light that passes through the rear and front modulators, to display time-multiplexed mask pairs, such that:
  (a) the pair of modulators generates an automultiscopic display;
  (b) each mask pair comprises a rear mask displayed by the rear modulator and a front mask simultaneously displayed by the front modulator; and
  (c) a set of multiple mask pairs produces a time-multiplexed light pattern that would, if integrated by a viewer's eye, comprise an approximation of a target light field, which approximation has a matrix rank higher than one.

16. The apparatus of claim 15, wherein the display is optimized to minimize Euclidean distance between the target light field and a light field produced by the pair of modulators.

17. Apparatus comprising a pair of LCDs, which pair of LCDs comprises a front LCD and a rear LCD and is configured, when backlit by light that passes through the rear and front LCDs, to display time-multiplexed mask pairs, such that:
  (a) the pair of LCDs displays an image that changes over time and that has horizontal and vertical parallax;
  (b) each mask pair comprises a rear mask displayed by the rear layer and a front mask displayed by the front layer, the front mask being displayed while the rear mask is displayed;
  (c) the image has a refresh rate that is between 13 Hz and 120 Hz; and
  (d) during each refresh of the image, a set of multiple mask pairs produces a time-multiplexed light pattern that would, if integrated by a viewer's eye, comprise an approximation of a target light field, which approximation has a matrix rank higher than one.

18. The apparatus of claim 17, wherein the display is optimized to minimize Euclidean distance between the target light field and a light field produced by the pair of modulators.

19. The apparatus of claim 17, wherein each of the mask pairs, respectively, is configured, when backlit, to produce a light field that is an approximation of the target light field, which approximation has a matrix rank of one.

20. The apparatus of claim 17, wherein each pixel, out of a majority of pixels in the front LCD, is configured to vary in opacity over a range, which range includes more than two opacity levels.

* * * * *